Feb. 23, 1943.  H. H. CHAPMAN  2,312,149
SCREW-THREADING APPLIANCE
Filed Nov. 7, 1941  3 Sheets-Sheet 1
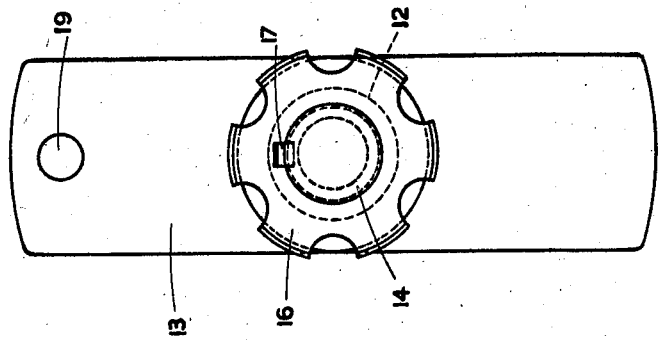
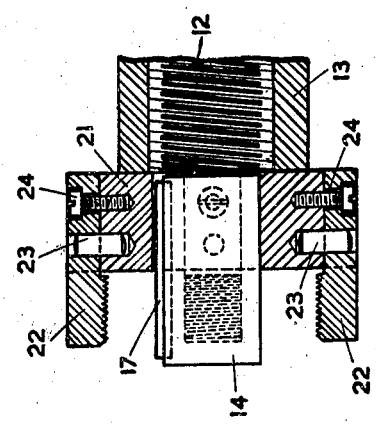
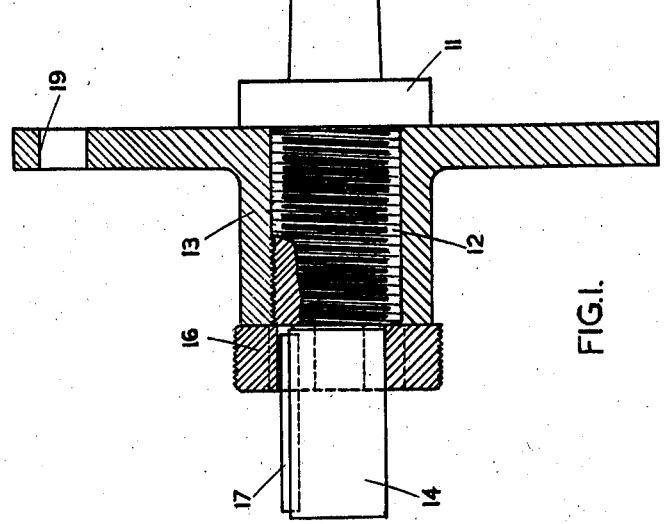
INVENTOR:
H. H. CHAPMAN.
BY
ATTORNEYS.

Feb. 23, 1943. H. H. CHAPMAN 2,312,149
SCREW-THREADING APPLIANCE
Filed Nov. 7, 1941 3 Sheets-Sheet 2

INVENTOR:
H. H. CHAPMAN.
BY
ATTORNEYS.

Patented Feb. 23, 1943

2,312,149

UNITED STATES PATENT OFFICE 2,312,149

SCREW-THREADING APPLIANCE

Herbert Haywood Chapman, Gainsborough, England, assignor to Rose Brothers (Gainsborough) Limited, Gainsborough, England, a British company Application November 7, 1941, Serial No. 418,173
In Great Britain November 21, 1940

14 Claims. (Cl. 10—89)

This invention relates to screw-threading appliances for cutting screw threads in metal or other materials in which threads can be cut.

In the well-known method of screwing or tapping articles in screwing machines, lathes, or the like, in which the common form of tap or die is used, the degree of accuracy in the finished thread depends to a large extent on the operator, who has to determine the rate of feed of the tap or die into the article to be threaded (hereinafter referred to as "work") merely by the "feel" of the machine. The determination of the rate of feed of the tap or die in this manner is particularly difficult when producing threads of fine pitch, for example, 30 threads per inch or more, especially when such threads are being cut in soft metals such as aluminium.

It is an object of the invention to avoid the above difficulty by providing a screw-threading appliance which can be readily applied to various standard forms of machine tools such as lathes, drilling machines and the like and in which the cutting tool, for example, tap or die, is positively fed into the work at the correct rate of feed for a thread of a given lead.

In accordance with the invention, therefore, there is provided a screw-threading appliance in which a cutting tool is carried on a support of which a portion is threaded for engagement with a threaded member, the arrangement being such that, as a relative rotary motion is brought about between the support and the work while there is no relative rotary motion between the threaded member and the work, the threaded member causes the cutting tool to move into cutting engagement with the work in a direction parallel to the axis of rotation at such a rate that it produces in the work a thread of the same lead as that of the threaded member and the support.

The cutting tool may be slidably mounted on the support in such a manner that there is no relative rotary motion between it and the support, in which case the thread of the support is of opposite hand to that of the thread to be cut.

Figure 4:
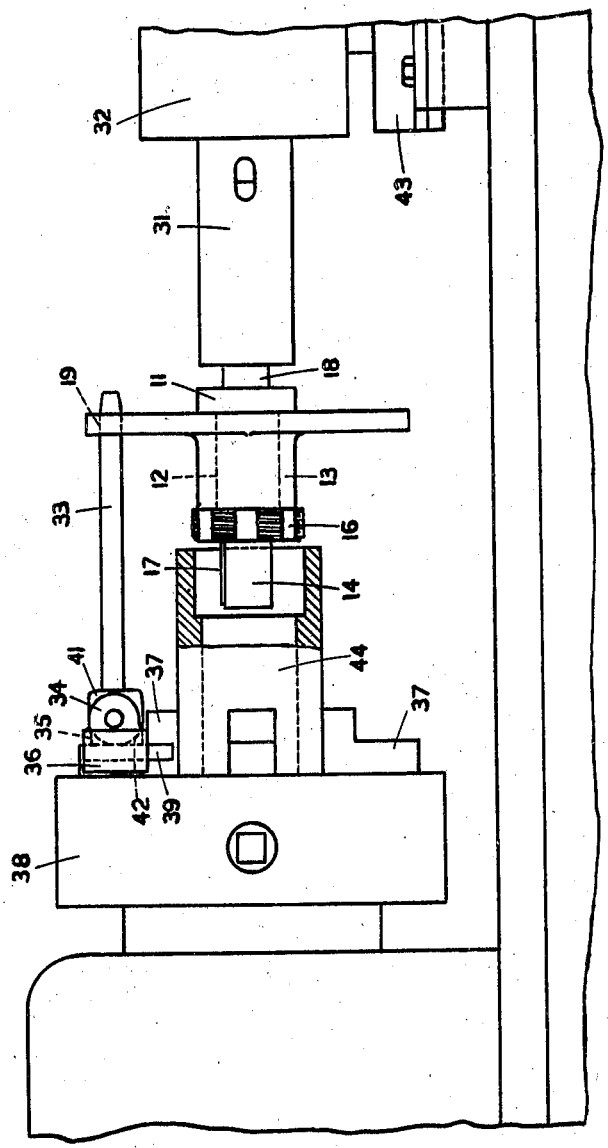
Figure 5:
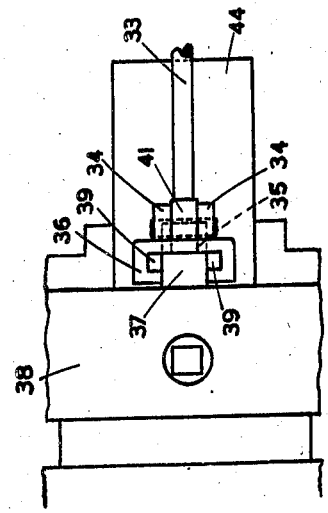
Figure 6:
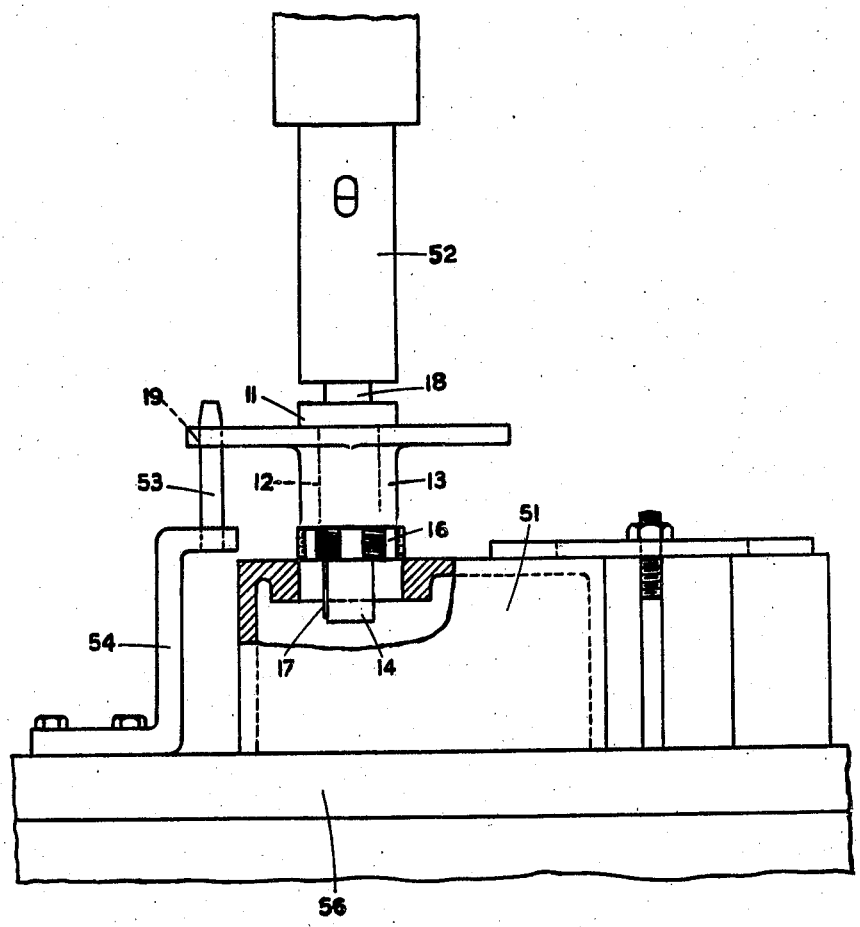

By way of example, the invention will now be described in greater detail with reference to the accompanying drawings, in which:

Figure 1 is a part-sectional elevation of an appliance according to the invention, arranged for internal screw-threading, Figure 2 is an end view of the appliance shown in Figure 1, Figure 3 is a part-sectional elevation, similar to Figure 1, showing the appliance modified for external screw-threading, Figure 4 is an elevation illustrating the appliance shown in Figures 1 and 2 in operation on a capstan lathe, Figure 5 is a plan view of a detail of Figure 4, and Figure 6 is an elevation illustrating the appliance shown in Figures 1 and 2 in operation on a drilling machine.

Referring to Figures 1 and 2 a support 11, a portion 12 of which is formed with a screw-thread of the same lead as the thread to be cut in the work but opposite hand thereto, supports a flanged sleeve 13 internally threaded for engagement with the threaded portion 12 of the support 11. Adjacent the threaded portion 12 of the support is a reduced portion 14 on which is slidably mounted a cutting member in the form of a fluted tap 16 having a size and form of thread appropriate to the thread to be cut in the work. A feather key 17 is provided to prevent rotation of the tap 16 on the support 11. The end of the support 11 opposite to that on which the tap 16 is mounted is formed with a tapered shank 18 of the well-known form used in machine tools. The flange of the sleeve 13 is provided with a hole 19, the purpose of which will be apparent from later description.

The appliance described above is arranged for internal screw-threading, and when it is desired to use the appliance for external threading it is modified as shown in Figure 3. In this case, the tap 16 is replaced by a die member 21 the periphery of which is slotted symmetrically for the reception of four dies 22 which are positioned by means of dowel pins 23 and secured to the die member 21 by screws 24.

Figure 4 shows the appliance described above with reference to Figures 1 and 2, in use on a capstan lathe. The tapered shank 18 is inserted into a sleeve 31 in the capstan head 32 of the lathe and the flanged sleeve 13 is arranged to be rotated at the same rate as the work to be tapped by a driving rod 33 arranged to pass into the hole 19 in the flange of the sleeve 13. The driving rod 33 is pivoted in bearings 34 carried by a bracket 36 which is shaped so as to be slipped over one of the jaws 37 of the chuck 38 of the lathe, plates 39 being secured to the sides of the jaw 37 to form a support for the bracket 36. The boss 41 of the rod 33 protrudes through a slot 35 in the wall of the bracelet 36 and is formed with a cam surface 42 which, as the bracket 36 is slipped on to the jaw 37 and the rod 33 pivoted downwardly into a horizontal position, bears against the front face of the jaw 37 which causes the bracket 36 to grip the plates 39 to lock the bracket on the jaw 37.

In operation, the bracket 36 is slipped on to the jaw 37 of the chuck and the driving rod 33 pivoted downwardly into a horizontal position, as described above, and the slide 43 of the lathe carrying the capstan head 32 is moved up towards the work 44 until the tap 16 is about to touch the work and locked in that position, the flange of the sleeve 13 having been previously turned to bring the hole 19 into alignment with the driving rod 33 so as to allow the flange to slip over the rod during the forward movement of the slide 43. The lathe is then started whereupon the rod 33 causes the sleeve 13 to rotate on the stationary support 11 at the same rate as the work 44. Because of the screw engagement between the threaded portion 12 of the support 11 and the flange 13, rotation of the flange causes it to move in an axial direction to push the tap 16 into cutting engagement with the work 44, and since the threaded portion 12 of the support 11 is of the same lead as the thread to be cut by the tap 16, the tap 16 is fed into the work at the correct rate of feed. After the tap 16 has been fed into the work 44 to the required depth, the lathe is stopped and reversed, during which operation the sleeve 13 is caused to move axially in the opposite direction and the tap 16 is caused to slide back along the support 11 by the work 44.

In Figure 6, the appliance shown in Figures 1 and 2 is shown in use on a drilling machine, and in this case the work 51 is held stationary while the support 11 is caused to rotate by the spindle 52 of the drilling machine. In order, therefore, to cause the tap 16 to be moved into the work 51, it is now necessary to restrain the sleeve 13 from rotation. This is brought about by means of a restraining rod 53 mounted in a bracket 54 secured to the table 56 of the drilling machine, the restraining rod 53 being caused to pass through the hole 19 in the sleeve 13 as the spindle 52 is lowered towards the work. In this case there is no shoulder in the bore of the work 51 so that there is no need to reverse the rotation of the spindle 52 upon completion of the tapping operation, the tap 16 passing through the work and falling from the end of the support 11 at the completion of the operation.

It will be seen that, since the tap or die of the appliances described above is positively fed into the work at the correct rate of feed, there is no langer of the threads becoming "stripped" during the screwing operation. This is particularly important when dealing with fine threads.

I claim:

1. A screw-threading appliance in which a cutting tool is slidably mounted for axial movement on a support of which a portion is threaded for engagement with a threaded member and means are provided for preventing relative rotary motion between the cutting tool and the support, the arrangement being such that, as a relative rotary motion is brought about between the support and the work while there is no relative rotary motion between the threaded member and the work, the threaded member causes the cutting tool to move into cutting engagement with the work in a direction parallel to the axis of rotation at such a rate that it produces in the work a thread of the same lead as and of opposite hand to that of the threaded member and the support.

2. Apparatus according to claim 1, wherein the cutting tool is in the form of a tap.

3. Apparatus according to claim 1, wherein the cutting tool is in the form of a die.

4. A screw-threading appliance comprising a cutting tool support formed with a shank adapted to be inserted in a standard type of socket in any machine capable of operating as a screwing machine, said support being formed with a threaded portion the thread of which is of the same lead as and of opposite hand to that of the thread to be cut in the work, a threaded member arranged in screw engagement with said threaded portion, a cutting tool slidably mounted for axial movement on said support, and key means between said support and the cutting tool for preventing relative rotary motion between the cutting tool and said support, the threaded member being adapted to be connected to the work in such a manner that there can be no relative rotary motion between it and the work so that, as a relative rotary motion is brought about between the said support and the work, the threaded member causes the cutting tool to slide along said support into cutting engagement with the work at a rate appropriate to the thread to be cut.

5. Apparatus according to claim 4, wherein the cutting tool is in the form of a tap.

6. Apparatus according to claim 4, wherein the cutting tool is in the form of a die.

7. Screw-threading apparatus comprising means for rotating the work, a stationary cutting tool support arranged with its axis in alignment with the axis of rotation of the work and formed wlith a threaded portion the thread of which is of the same lead as and of opposite hand to that of the thread to be cut in the work, a threaded member arranged in screw engagement with said threaded portion, a cutting tool slidably mounted for axial movement on said support, key means between said support and the cutting tool for preventing relative rotary motion between the cutting tool and said support, and means for rotating the threaded member at the same rate as the work so that, during rotation of the work, the threaded member causes the cutting tool to slide along said support into cutting engagement with the work at a rate appropriate to the thread to be cut.

8. Apparatus according to claim 7, wherein the cutting tool is in the form of a tap.

9. Apparatus according to claim 7, wherein the cutting tool is in the form of a die.

10. Screw-threading apparatus of the type in which the work remains stationary during the threading operation, comprising a rotatable cutting tool support formed with a threaded portion the thread of which is of the same lead as and of opposite hand to that of the thread to be cut, a threaded member arranged in screw engagement with said threaded portion, a cutting tool slidably mounted for axial movement on said support, key means between said support and the cutting tool for preventing relative rotary motion between the cutting tool and said support, and means for restraining the threaded member from rotating during rotation of said support so that, during rotation of said support, the threaded member causes the cutting tool to slide along said support into cutting engagement with the work at a rate appropriate to the thread to be cut.

11. Apparatus according to claim 10, wherein the cutting tool is in the form of a tap.

12. Apparatus according to claim 10, wherein the cutting tool is in the form of a die.

13. A screw-threading attachment for a capstan or like lathe, comprising a cutting tool support formed with a shank adapted to be inserted in the capstan head, said support being formed with a threaded portion the thread of which is of the same lead as and of opposite hand to that of the thread to be cut in the work, a threaded member arranged in screw engagement with said threaded portion, a cutting tool slidably mounted for axial movement on said support, means including a key for preventing relative rotary motion between the cutting tool and said support, a driving member adapted for attachment to the chuck and arranged to engage the threaded member so that, during rotation of the chuck, the threaded member is rotated at the same rate as the chuck and causes the cutting tool to slide along said support into cutting engagement with the work carried by the chuck at a rate appropriate to the thread to be cut.

14. A screw-threading attachment for a drilling or like machine, comprising a cutting tool support formed with a shank adapted to be inserted in the rotatable spindle of the machine, said support being formed with a threaded portion the thread of which is of the same lead as and of opposite hand to that of the thread to be cut in the work, a threaded member arranged in screw engagement with said threaded portion, a cutting tool slidably mounted for axial movement on said support, means including a key for preventing relative rotary motion between the cutting tool and said support, a stop member adapted for attachment to the bed of the machine and arranged to engage the threaded member so as to restrain it from rotating during rotation of said support so that, during rotation of said spindle, the threaded member causes the cutting tool to slide along said support into cutting engagement with the work at a rate appropriate to the thread to be cut.

HERBERT HAYWOOD CHAPMAN.